United States Patent [19]
Gueziec et al.

[11] Patent Number: 6,031,548
[45] Date of Patent: Feb. 29, 2000

[54] PROGRESSIVE MULTI-LEVEL TRANSMISSION AND DISPLAY OF TRIANGULAR MESHES

[75] Inventors: Andre Pierre Gueziec, Mamaroneck, N.Y.; Francis Lazarus, Ritiers, France; Gabriel Taubin, Hartsdale, N.Y.

[73] Assignee: International Business Machines Corporation, Armonk, N.Y.

[21] Appl. No.: 09/023,757

[22] Filed: Feb. 13, 1998

Related U.S. Application Data

[60] Provisional application No. 60/049,530, Jun. 13, 1997.

[51] Int. Cl.[7] .................................................. G06F 15/00
[52] U.S. Cl. ............................................................ 345/440
[58] Field of Search .................................. 345/440, 423, 345/441, 443, 118, 121

[56] References Cited

U.S. PATENT DOCUMENTS

| | | | |
|---|---|---|---|
| 4,845,651 | 7/1989 | Aizawa et al. | 364/522 |
| 5,602,564 | 2/1997 | Iwamura et al. | 345/119 |
| 5,675,720 | 10/1997 | Sato et al. | 345/420 |

OTHER PUBLICATIONS

Gueziec, Andre, "Surface Simplification with Variable Tolerance", MRCAS '95, Nov. 4, 1995, 8 pages.

Taubin, Gabriel et al., "Geometric Compression Through Topological Surgery", RC20340 (#89924) Jan. 16, 1996, Computer Sciences, 22 pages.

Guezie, Andre, et al., Cutting and Stitching: Efficient Conversion of a Non-Manifold Polygonal Surface to a Manifold, RC20935 (92693), Jul. 25, 1997, Computer Science/Mathematics, 32 pages.

Guezie, Andre, "Surface Simplification Inside a Tolerance Volume", RC 20440(90191) May 20, 1997 Updated/Revised, Computer Science/Mathematics, 56 pages.

Roufard, Remi et al., "Full-range approximation of triangulated polyhedra", Eurographics, vol. 15, 1996, No. 3, 10 pages.

*Primary Examiner*—Phu K. Nguyen
*Attorney, Agent, or Firm*—Jay P. Sbrollini; Perman & Green, LLP

[57] ABSTRACT

Disclosed is a representation and file format for a multi-level progressive transmission or display of a triangular mesh, referred to as a Progressive Multi-Level Representation (PMR). Methods are disclosed for generating the PMR, for progressively building a triangular mesh from a PMR representation, and for extracting a particular level of detail of a triangular mesh from the PMR representation.

25 Claims, 10 Drawing Sheets

PROGRESSIVE MULTI-LEVEL TRANSMISSION AND DISPLAY OF TRIANGULAR MESHES

CLAIM OF PRIORITY FROM A COPENDING PROVISIONAL PATENT APPLICATION

Priority is herewith claimed under 35 U.S.C. §119(e) from copending Provisional Patent Application No. 60/049,530, filed Jun. 13, 1997, entitled "[1]Surface Partitions for Progressive Loading and Display and Dynamic Simplification of Polygonal Surfaces", by A. P. Gueziec, F. Lazarus, and G. Taubin. The disclosure of this Provisional Patent Application is incorporated by reference herein in its entirety.

FIELD OF THE INVENTION

This invention generally relates to the fieLd of computer graphics and, in particular, to methods for progressively displaying or transmitting a triangular mesh.

BACKGROUND OF THE INVENTION

Polygonal surfaces are widely used for representing three dimensional (3-D) geometric models. Such surfaces consist of a plurality of polygons, which are cycles of vertices, whose coordinates are generally expressed in a modeling space coordinate system. The polygonal surfaces may be used for generating pictures and animations, and may also be used in Computer Aided Design (CAD) systems, in scientific visualization, and in medical imaging.

Although modeling systems used in Mechanical Computer Aided Design and in animation are expanding their geometric domain to include free form surfaces, polygonal models remain the primary 3D representation used in the manufacturing, architectural, Geographic Information Systems, geoscience, and entertainment industries. Polygonal models are particularly effective for hardware assisted rendering, which is important for video-games, virtual reality, fly-through, and electronic mock-up applications involving complex CAD models.

Since methods are known in the prior art for easily and efficiently triangulating arbitrary polygonal faces, it is sufficient to consider geometric models which are defined by triangular meshes. For example, a method to triangulate the faces of a polygonal model is described by Ronfard, R. and Rossignac, J. in "Triangulating multiply-connected polygons: A simple, yet efficient algorithm", Computer Graphics Forum, V. 13, No. 3, 1994, pp. 281–292.

A "triangular mesh" is defined by the position of its vertices ("geometry"), which are N-dimensional vectors, by the association between each triangle and its sustaining vertices ("connectivity"), and by colors, normals, and texture coordinates ("properties"), which do not affect the geometry, but influence the way it is shaded.

A triangular mesh with V vertices and T triangles is typically represented in the prior art (for example, as described by Foley et.al. in "Computer Graphics: Principles and Practice", Addison-Wesley, 1990) by a "vertex positions array", a "triangle array", and (optionally) one or more "property arrays". The position of each vertex of the triangular mesh is represented in the vertex positions array by N floating point coordinates. Each triangle of the triangular mesh is represented in the triangle array by three indices to the vertex positions array.

A triangular mesh may also have continuous or discrete properties, such as colors, normals, and texture coordinates, associated with its vertices or triangles. To model various discontinuous phenomena on the triangular mesh, properties can also be associated with each vertex of each triangle. These (triangle,vertex) pairs are called "corners", and the corresponding properties "corner" properties. These corner properties are represented in the optional property arrays.

Triangular meshes are typically classified (for example, as described by Hoffmann, C., "Geometric and Solid Modeling", Morgan Kaufmann, 1989) as manifolds and non-manifolds. An "edge" of a triangular mesh is a pair of vertices in a triangle, without taking into account the order of the two vertices within the edge. The two vertices of an edge are called endpoints of the edge. The triangle is said to be incident to the edge, and the edge incident to the vertices. Two triangles sharing an edge are said to be adjacent. Two edges sharing a vertex are said to be adjacent. The set of triangles that share a vertex are referred to as the star of the vertex. The number of triangles in the star of a vertex can be referred to as the valence of the vertex. The link of a vertex is obtained by connecting all adjacent edges bounding the star of the vertex and discarding from the list of edges so formed the edges incident to the vertex. If the link has one component, and is not intersecting itself, the vertex is said to be a regular vertex, otherwise it is referred to-as a singular vertex. For a regular vertex, if the link is closed, meaning that the first end point of the first edge of the link is the same as the last end point of the last edge, the vertex is an interior regular vertex, otherwise it is a boundary vertex.

The edges of a triangular mesh define a partition of the vertices of the triangular mesh into one or more disjoint subsets of vertices such that the two endpoints of each edge of the triangular mesh belong to the same subset. This partition of the vertices of the triangular mesh defines an associated partition of the triangles of the triangular mesh into one or more disjoint subsets of triangles, which are in one to one correspondence with the subsets of vertices. The subset of triangles associated with a subset of vertices is composed of all the triangles of the triangular mesh with vertices in the subset of vertices. If the triangular mesh has properties, the partition of the vertices also defines corresponding partitions of the properties in a similar manner. Each subset of vertices, the corresponding subset of triangles, and (optionally) the corresponding subsets of properties define a new triangular mesh which is called a "connected component" of the triangular mesh.

A triangular mesh is referred to as a "manifold triangular mesh" if the following two conditions are satisfied: 1) if any two triangles of the triangular mesh intersect, the intersection is either a common vertex or a common edge; and 2) all the vertices of the triangular mesh are regular vertices, which implies that each edge of the triangular mesh is shared by at most two triangles.

An edge of a manifold triangular mesh may have either one or two incident triangles. An "interior edge" is an edge with two incident triangles. A "boundary edge" is an edge with one incident triangle. It is known that the endpoints of the boundary edges of a manifold triangular mesh are boundary vertices, and that the boundary vertices of a manifold triangular mesh are endpoints of the boundary edges. The boundary edges of a manifold triangular mesh can be partitioned into one or more disjoint subsets of boundary edges referred to as "boundaries", such that two boundary edges which share a boundary vertex as a common endpoint belong to the same boundary. It is also known that each boundary vertex of a manifold triangular mesh is the endpoint of exactly two boundary edges.

It has been found that typical polygonal surfaces may be so large that real time interaction is impossible using currently available hardware, or that the transmission of the data describing the surfaces over computer networks is unacceptably slow. Providing different resolutions, or levels of details (LODs), of such polygonal surfaces overcomes this problem, as it is possible to use an appropriate lower LOD for a given task. Such LODs may be generated using a software modeling tool or by using algorithms that automatically produce LODs. One example of such algorithms is described in commonly assigned U.S. Pat. No. 5,448,686 "Multi-Resolution Graphic Representation Employing at Least One Simplified Model for Interactive Visualization Applications", by P. Borrel and J. Rossignac, the disclosure of which is incorporated by reference herein in its entirety. Another example of a LOD generation algorithm is described in commonly assigned U.S. Patent Application "Surface Simplification Preserving a Solid Volume and Respecting Distance Tolerances", Ser. No. 08/742,631 filed Nov. 1, 1996, by A. Gueziec, herein incorporated by reference in its entirety. Reference in this regard may also be had to a publication entitled "Surface Simplification with Variable Tolerance", A. Gueziec, Second Annual International Symposium on Medical Robotics and Computer Assisted Surgery, pages 132–139, Baltimore, Md., November 1995.

Such polygonal surfaces and LODs of polygonal surfaces are increasingly exchanged over computer networks. When transmitting several LODs of the same polygonal surface, it is desirable to avoid transmitting duplicate information.

In addition, when transmitting the data through a computer network, one may wish to progressively display a surface such that while the computer is busy preparing high resolution images, lower resolution images are quickly available for display and interaction using simplified models.

Conventional methods for producing levels of details from polygonal surfaces include four techniques, described by Hoppe "Progressive Meshes", Proceedings of ACM SIGGRAPH'93, pp.99–108, by Eck et al. "Multi-resolution analysis of arbitrary meshes", Proceedings of ACM SIGGRAPH'95, pp. 173–182, by Popovic et al. "Progressive Simplicial Complexes", Proceedings of ACM SIGGRAPH'97, pp. 217–224, and by De Floriani et al. "Building and Traversing a Surface at Variable Resolution", IEEE Visualization'97, pp. 103–110. The technique of Hoppe builds a progressive mesh representation that consists of a description of the transition from a simplified mesh to the original mesh. Hoppe sends a succession of "vertex splits", in order to undo the edge collapses that he performed earlier. For each of these vertex splits, he must specify the indices in the original mesh of the simplified vertex resulting from the collapse, as well as the indices of the neighboring vertices where the new triangles will be inserted. In addition, the displacement of the new vertex with respect to the previous position of the vertex must be specified.

One problem with Hoppe's Progressive Meshes technique is that each vertex split information contains a vertex identification (ID), the position of two vertices after splitting, and the relative position of two vertices in the neighborhood of the first vertex. This results in sending a significant amount of information. Since the number of vertex splits that are specified are generally on the order of magnitude of n, the information that must be provided with Hoppe's method can be assumed to be on the order of n*log(n) or higher.

Another drawback to the use of Hoppe's method is that each individual vertex split must be specified.

The technique of Eck et al. builds an approximation of the original mesh that has the same connectivity as a subdivided surface. The position of the vertices are treated as a signal decomposed over a multi-resolution wavelet basis. Levels of detail are obtained by varying the number of wavelet coefficients that are transmitted. One problem with this approach is that the highest level of detail is still an approximation to the original polyhedron, and one may need to provide an unacceptably large number of wavelet coefficients to approach the original polygonal surface with sufficient accuracy. In general, this technique is only suitable if a lossy result for geometry and topology is acceptable. It should also be noted that Eck's techniques for building the base surface are complex and computationally expensive. Further, it should be noted that when the topology of the surface is fairly complex, i.e, when the surface has a large number of boundary curves or an Euler characteristic largely higher or largely lower than zero (for instance, a torus has an Euler characteristic of 0, a double torus of −2, a triple torus of −4 and so on, a disk has one boundary curve corresponding to the outer circle of the disk; boundary curves and the Euler characteristic are defined in various textbooks such as Massey's "Algebraic Topology", Springer Verlag, 1977), it is not clear whether Eck's method and related methods can obtain a useful approximation of the surface.

The Progressive Simplicial Complexes technique of Popovic and Hoppe is a generalization of the Progressive Meshes technique to simplicial complexes formed with points, lines, surfaces and volumes. A vertex split is replaced with a "generalized vertex split", and additional information is necessary to encode whether the added vertex will add a point, a line segment, a triangle, or a tetrahedron to the complex. This method suffers from the same limitations as Hoppe's, when applied to a polygonal surface.

The Multi-Triangulation technique of De Floriani et al. is essentially a method for representing several levels of detail of a surface simultaneously, using a directed acyclic graph whose nodes represent increases and decreases of the number of triangles and whose arcs represent the dependencies between such increases or decreases. It is not stated how the levels of detail could be transmitted efficiently.

OBJECTS AND ADVANTAGES OF THE INVENTION

It is a first object and advantage of this invention to provide a computer data structure for representing a multi-level progressive representation of a triangular mesh.

It is another object and advantage of this invention to provide a novel method for partitioning a surface in Levels of Detail (LODs), using the output of any suitable algorithm that performs edge collapses on a surface.

It is a further object and advantage of this invention to provide a method to convert a cluster representation of a triangular mesh to a multi-level progressive representation of the triangular mesh.

It is another object and advantage of this invention to provide a method for enabling smooth transitions, or geomorphs, between levels of detail of a triangular mesh.

SUMMARY OF THE INVENTION

The foregoing and other problems are overcome and the objects and advantages are realized by methods and apparatus in accordance with embodiments of this invention.

An aspect of this invention is a novel representation and file format for a multi-level progressive transmission or display of a triangular mesh, referred to herein as a Progressive Multi-Level Representation (PMR). Methods are disclosed for progressively building a triangular mesh from a PMR representation, and for extracting a particular level of detail of the triangular mesh from the PMR representation. In accordance with a further aspect of this invention methods are disclosed for generating the PMR.

The teachings of this invention provide a novel method for partitioning a surface in Levels of Detail (LODs), using the output of any suitable algorithm that performs edge collapses on a surface. For global LODs, the representation is comprised of a batch of surface portions, each surface portion being represented with point positions and an indexed face set. Each surface portion corresponds to an increment from one level of detail to the next level of detail. In addition, an array of vertex representatives is provided and vertex indices are replaced with their representatives before display.

A system is disclosed for generating a representation of a triangular mesh, as are methods for operating the system. The system includes a memory that stores a data structure for representing a multi-level progressive representation of the triangular mesh. The data structure includes triangular mesh vertex coordinates and triangle vertex indices that are stored in batches from a highest level of detail ($L_{max}$), associated with a lowest resolution, to a lowest level of detail (1), associated with a highest resolution. Also stored are vertex representative indices for triangle vertex indices having a value outside of a range allowed in a current level of detail. The system further includes at least one data processing unit and a program executed by the at least one data processing unit.

In one aspect the program operates to extract a particular level of detail i from the multi-level progressive representation, and further operates to determine those vertices and triangles participating in the level of detail i, including determining a highest index $n_{v,i}$ of a vertex participating in the level of detail. For each triangle participating in the level of detail, and for each vertex index of the triangle, the program operates to replace each vertex index with a representative vertex index that is in a valid range of indices between 0 and ($n_{v,i}-1$).

The system further includes a network interface coupled to a data communications network, and in one embodiment a download thread for progressively downloading from the network a total number of levels of detail, as well as triangle, vertex, and attribute data of the triangular mesh.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
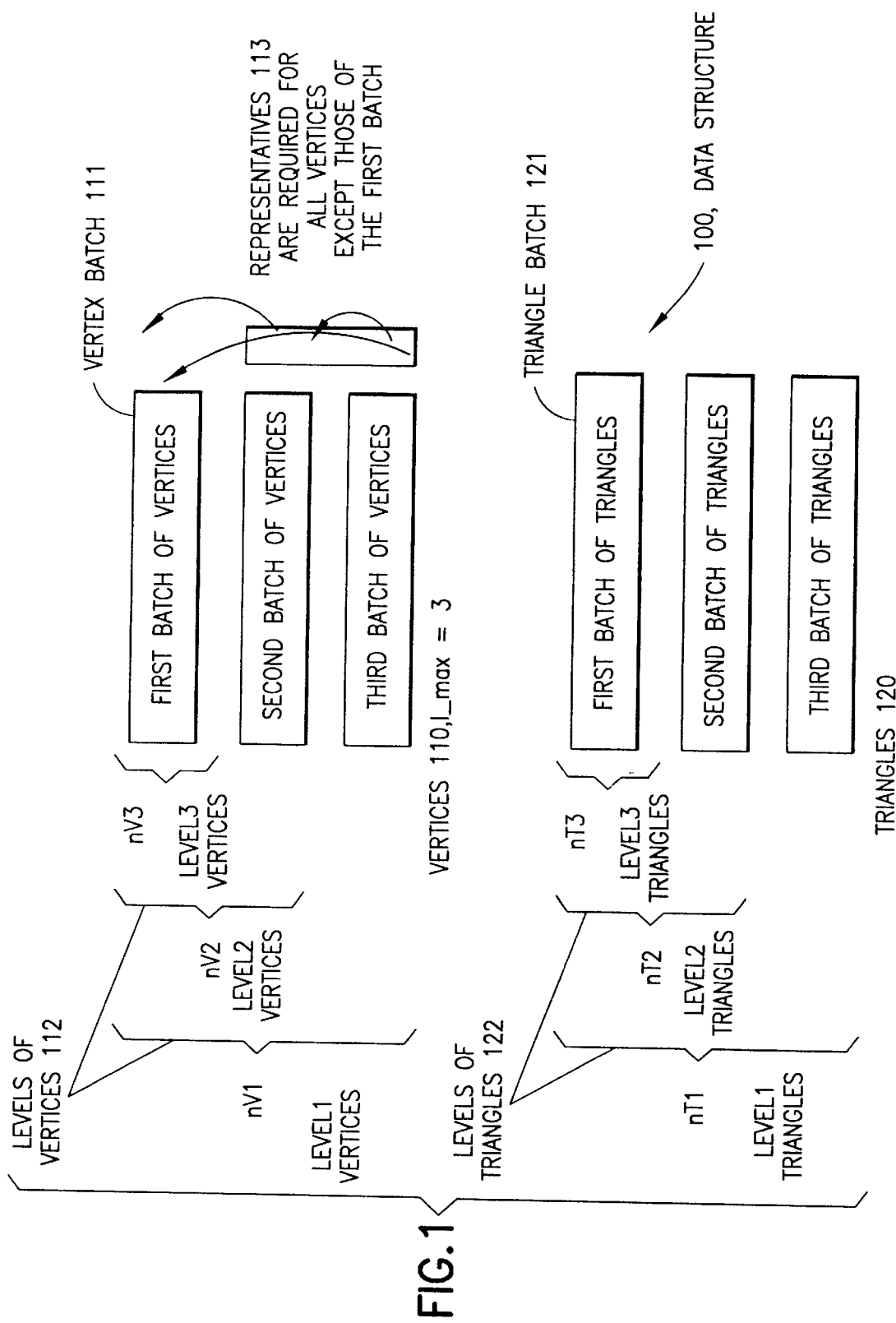
FIG. 1 is a block diagram of a data structure for representing the Progressive Multi-Level Representation (PMR) that is a feature of this invention.

By way of introduction the inventors have described techniques wherein a lower level of detail (LOD) triangular mesh is transmitted first, followed with a succession of operations that permit one to modify the lower LOD triangular mesh to construct the higher LOD triangular meshes. The operations include cutting through a set of marked edges, displacing boundary vertices resulting from the cut by a pre-determined amount, and filling the holes left with a collection of triangles.

Reference can be had in this regard to a first method described in copending U.S. patent application Ser. No. 09/006,771, filed Jan. 14, 1998, entitled "Compressed Representation of Changing Meshes and Method to Decompress", by G. Taubin and A. Gueziec (Attorney Docket No.: Y0997-438).

Reference may also be had to a second method described in copending U.S. patent application Ser. No. 09/006,988, filed Jan. 14, 1998, entitled "Method for Generating and Applying Changes in the Level of Detail of a Polygonal Surface", by G. Taubin, A. Gueziec, and F. Lazarus (Attorney Docket No.: Y0997-004).

Also of interest is a third method described in copending U.S. patent application Ser. No. 08/976,247, filed Nov. 21, 1997, entitled "Progressive Compression of Clustered Multi-Resolution Polygonal Models", by P. Borrel, W. Horn, and G. Taubin.

In this latter commonly assigned patent application all of the triangles of the highest resolution triangular mesh are transmitted first, followed by information on how to cluster vertices to obtain lower levels of detail, followed by the coordinates of the vertices, starting with vertices of the high resolution mesh and finishing with vertices of the lower resolution mesh. Reference can be had to the following first exemplary ascii file, which represents a triangular mesh as a multi-level clustered mesh (the symbol # precedes a comment), in accordance with the teachings of the copending U.S. patent application Ser. No. 08/976,247, filed Nov. 21, 1997, entitled "Progressive Compression of Clustered Multi-Resolution Polygonal Models", by P. Borrel, W. Horn, and G. Taubin.

| First ASCII File | |
|---|---|
| # multi-level clustered mesh | |
| nL = 3 | # number of levels of detail |
| nD = 3 | # dimension of the vertex coordinates (here coordinates in 3-space) |

-continued

First ASCII File

```
nT = 10       # number of triangles of the high resolution mesh
 1  0  2     # first triangle
 3  1  2
 2  8  3
 1  3  4
 6  4  3
 3  8  6
 9  6  8
 4  6  5
 7  5  6
 6  9  7     # last triangle
nV = 10       # number of vertices of the high resolution mesh:
                Level 1
   #      x      y      z    maps to vertex -3.0    3.0    0.0    0  # first vertex
        -2.3    3.0    0.0    1
        -3.0    2.3    0.0    2
        -2.3    2.3    0.0    3
         2.3    3.0    0.0    4
         3.0    3.0    0.0    4
         2.3    2.3    0.0    4
         3.0    2.3    0.0    4
        -3.0   -3.0    0.0    5
         3.0   -3.0    0.0    6  # last vertex
nV = 7        # number of vertices of the next lower level of
                detail: Level 2
        -3.0    3.0    0.0    0  # first vertex
        -2.3    3.0    0.0    0
        -3.0    2.3    0.0    0
        -2.3    2.3    0.0    0
         2.3    3.0    0.0    1
         3.0    3.0    0.0    2
         2.3    2.3    0.0    3  # last vertex
nV = 4        # number of vertices of the next lower level of
                detail: Level 3
   #      x      y      z    no map -3.0    3.0    0.0    # first vertex
        -3.0   -3.0    0.0
         3.0    3.0    0.0
         3.0   -3.0    0.0    # last vertex
```

The techniques referenced above satisfy different purposes. For example, the first method provides a general framework to represent changes in a triangular mesh in a compressed form, while the second method is better suited for use when the resolution of the mesh changes dramatically during the progressive transmission (for example when the number of vertices of the highest resolution mesh is more than a hundred times the number of vertices of the lowest resolution mesh), wherein sending the full resolution connectivity may be too costly. Furthermore, the third method can be used to advantage when the resolution of the mesh does not change dramatically (for example when the number of vertices in the high resolution mesh is less than ten times the number of vertices in the low resolution mesh).

The present invention is particularly adapted to change the level of detail of a mesh so as to display it at various resolutions after it has been completely transmitted. For example, the method described in copending U.S. patent application Ser. No. 08/976,247, filed Nov. 21, 1997, entitled "Progressive Compression of Clustered Multi-Resolution Polygonal Models", by P. Borrel, W. Horn, and G. Taubin, could be used to transmit the mesh, and the method in accordance with this invention could then be used to convert the mesh to a PMR, and to display the mesh at a variety of resolutions. However, the PMR can be used for transmission as well.

One important aspect of the present invention is a novel representation referred to as the Progressive Multi-Level Representation (PMR), as well as a data structure for transmitting or displaying a triangular mesh progressively in increasing resolution, and for interactively selecting a particular resolution for display, printing, or other computations.

It should be noted that in the present invention a Level noted as 1 represents the finest mesh, or equivalently the mesh with the most detail, while a Level noted as Lx represents the coarsest mesh, or equivalently the mesh with the least detail. Of course, other conventions could be employed for specifying the various levels of detail.

The representative of a vertex v is defined as the vertex ID of another vertex that is substituted for the vertex v at a given time. By substituting a vertex with another vertex in the triangles of a mesh, one can modify triangles and obtain different levels of detail, as is shown in FIG. 6.

Figure 6:
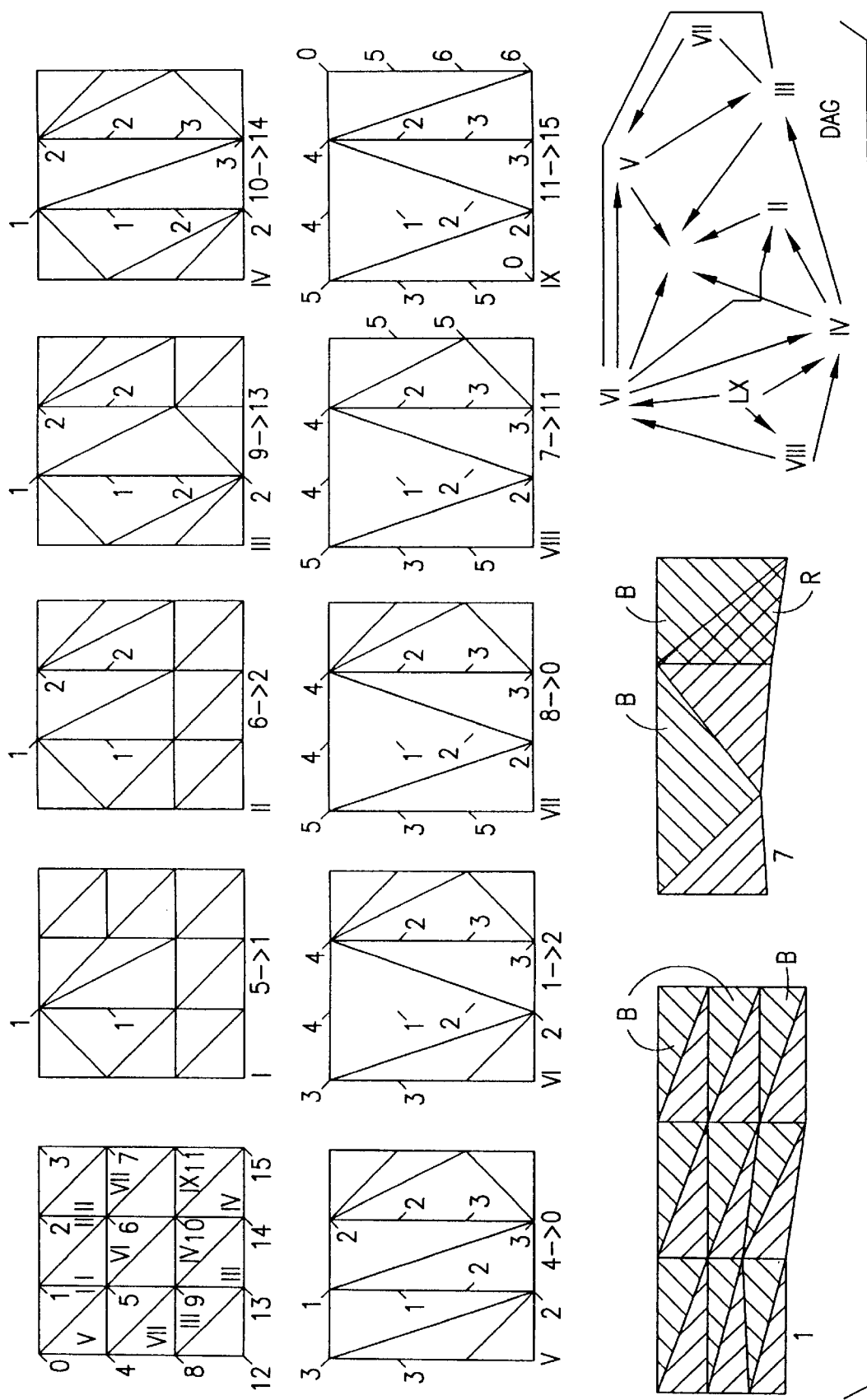
FIG. 6 illustrates a preferred method to assign levels to vertices and determine vertex representatives.

In FIG. 6, a first step employs a Simple surface, wherein edge collapses, numbered I through IX, affect the levels of the vertices as shown. Triangles removed during the collapses are shown in the upper left. The Level 1 and Level 7 surfaces are shown along with a Directed Acyclic Graph (DAG) representing the partial ordering of the edge collapses. A further discussion of the DAG representation is provided below.

Each edge collapse may be considered to have a status; wherein S indicates "split", meaning that the collapse is not performed currently, while C indicates "collapsed", meaning that the collapse is currently performed.

A conventional method for representing a triangle mesh is to list the vertex coordinates and then the triangle vertex indices in a file. The representation in accordance with this invention does not change the vertices and triangles of the original triangular mesh; however, such vertices and triangles are listed in order of decreasing level of detail. The method in accordance with this invention thus departs from the conventional techniques in several ways.

First, a collection of vertex and triangle lists are specified, one pair (vertex list, triangle list) being provided for each level of detail, in order of decreasing level of detail. A pair (vertex list, triangle list) of Level i is referred to as a batch of Level i. To specify the Level of detail i of the triangular mesh, all batches of Levels i, i+1 . . . ,$L_{max}$ are required.

Second, for each Level of detail i of the triangular mesh, the total number of vertices of the Level of detail is determined as the sum of vertices in batches i, i+1 . . . ,$L_{max}$ and is denoted by $n_{vi}$. For each triangle vertex index that is not between 0 and ($n_{vi}-1$) a vertex representative index is specified, as described below in a second exemplary ascii file. If the vertex representative index is not between 0 and ($n_{vi}-1$), then a vertex representative index is specified for it. A succession of vertex representative indices is specified such that the last vertex representative index is between 0 and ($n_{vi}-1$).

Reference is made to the following exemplary ascii file for distributing the simple surface in three progressive LODs using the PMR in accordance with the teaching of this invention. As before, the symbol # precedes a comment.

Second ASCII File

```
# multi-level progressive triangular mesh

# BATCH 1
```

-continued

Second ASCII File

{#coordinates of vertices at level L_max < - 3
x y z,      #v0
...
x y z,      #v6
}
{#triangles at level 3, followed with map
  1,    9,   2,   -1,   7, 6, # representative of 9 is 7
                              and of 7 is 6 (<7)
  7,   13,  12,   -1,   1, 5,
 11,   14,  15,   -1,   0, 4, 10, 1
 12,   15,  14,   -1,
  3,    4,   8,   -1,   0,
}
BATCH 2
{#coordinates of vertices at level 2
x y z,      #v7
...
x y z,      #v12
}
{#triangles at levels 2; no map is necessary
  6,    7,  12,   -1,
  8,   14,  11,   -1,
  7,    9,  13,   -1,
 12,   13,  15,   -1,
  0,   11,  15,   -1,
  5,   12,  14,   -1,
  5,    6,  12,   -1,
}
{# BATCH 3
{#coordinates of vertices at level 1
x y z,      #v13
x y z,      #v14
x y z,      #v15
}
{#triangles at levels 1; no map is necessary
 10,   13,   1,   -1,
  1,   13,   9,   -1,
  8,    4,  14,   -1,
 14,    4,   5,   -1,
  0,   15,  10,   -1,
 10,   15,  13,   -1,
}

FIG. 1 depicts a data structure 100 for the PMR. The data structure 100 includes a data structure for vertices 110 and a data structure for triangles 120. For illustrative purposes, FIG. 1 employs the same number of levels as the exemplary mesh described in the foregoing ascii file. In addition, the data structure for vertices 110 comprises one or more vertex batches 111, one or more vertex levels 112 and vertex representatives 113. The data structure for triangles 120 comprises the same number of triangle batches 121 as vertex batches 111, and the same number of triangle levels 122 as vertex levels 112.

Using this representation, the triangular mesh may be transmitted in order of decreasing levels (from lower detail to higher detail). For each level of detail, the triangle vertex indices that are larger than or equal to $n_{vi}$ are replaced by their representative, following the hierarchy described above, until the representative index is between 0 and $(n_{vi}-1)$. The foregoing ascii file represents an exemplary file format for storing the aforementioned representation for transmission through a network.

Figures 3, 4:
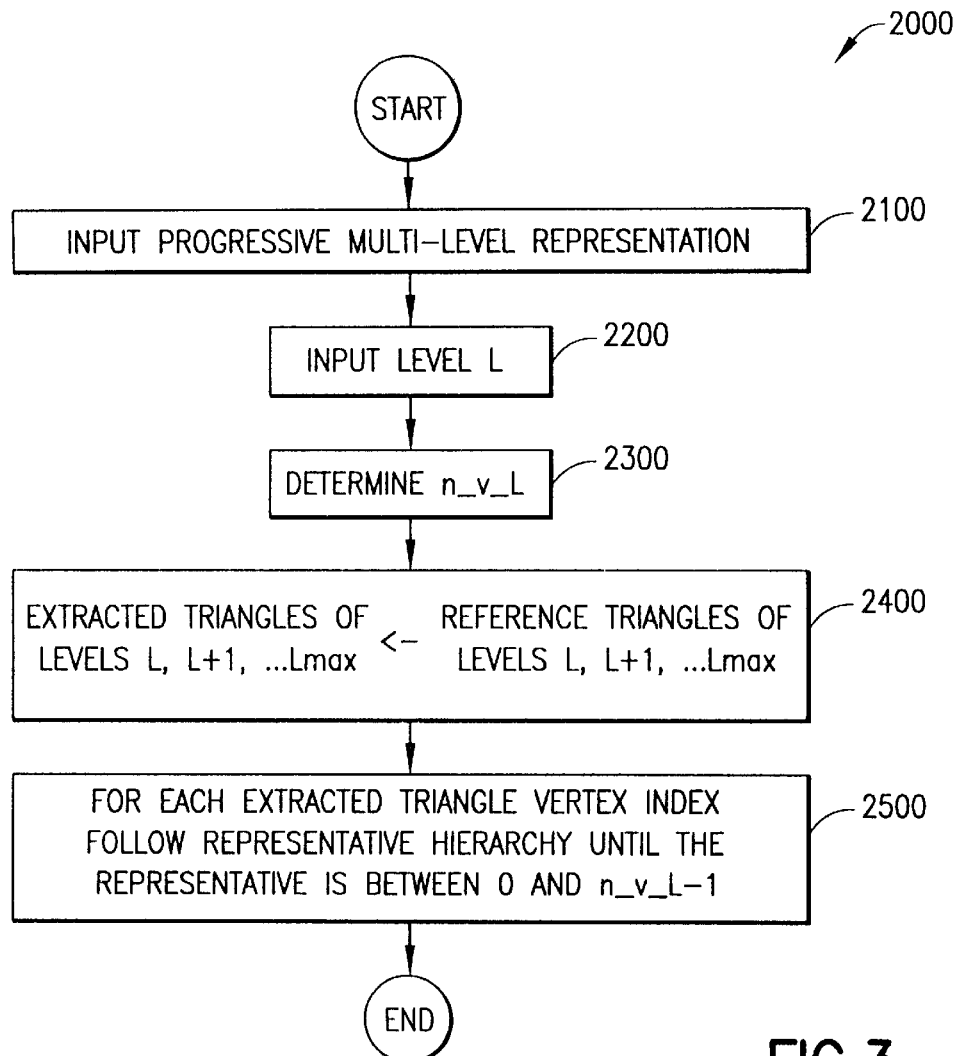
FIG. 3 is a flow chart of a method for extracting a particular level of detail from a PMR.
FIG. 4 is a diagram illustrating a vertex representative array, and a path compressed representative (pc-rep) array.

A description is now made of effectively compressing the representative hierarchy. In FIG. 4 an array of vertex indices is shown together with the vertex representatives. For example, the representative of vertex index 9 is 7, and in turn the representative 7 is 6, and the representative of 6 is 6. Likewise, the representative of 15 is 10, the representative of 10 is 1, and the representative of 1 is 1.

Accordingly, and when referring to vertex index 15, the representative hierarchy is followed through 10 and 1, which is the final representative, because the representative of 1 is 1. Likewise, when referring to vertex index 9, the representative hierarchy is followed through 7 and then 6.

Direct access to the final representative is obtained using the path compressed representative array, or pc-rep array, wherein each final representative is provided for each vertex, thereby avoiding the need to follow the path of representatives every time. Preferably, the pc-rep occupies a different storage location, to avoid overwriting the representatives.

Figure 2:
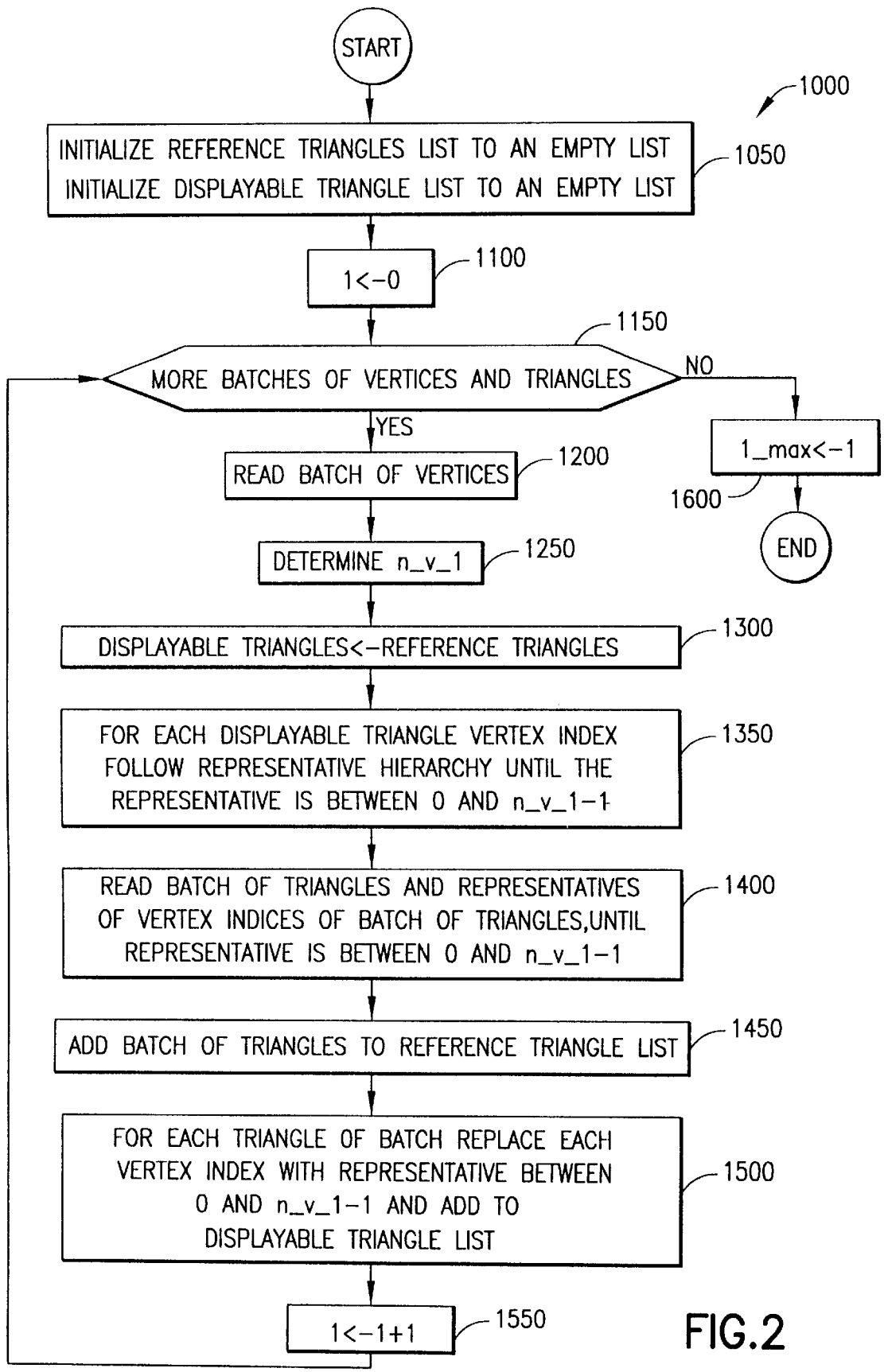
FIG. 2 is a flow chart of a method for progressively building a triangular mesh from a PMR.

A method for progressively building a triangular mesh from a PMR is now described with reference to FIG. 2. In Step 1050, a "reference triangle" list is initialized to an empty list and a "displayable triangle" list is initialized to an empty list. In Step 1100, the number of Levels 1 of the triangular mesh is initialized to 0. In Step 1150, a determination is made as to whether there are remaining batches 111 and 121 of vertices and triangles (see FIG. 1) in the PMR. If this is the case, the next batch of vertices 111 and triangles 121 is read in Step 1200 and the method proceeds to Step 1250. If instead there are no remaining vertex and triangle batches, Step 1600 is executed as described below and the method ends. In Step 1250, the value of $n_{vi}$ is determined as the total number of vertices belonging to the batches that were read thus far. In Step 1300 a copy is made of the reference triangle list to the displayable triangle list. In Step 1350, for each displayable triangle vertex index, the representative hierarchy is followed until the representative is between 0 and $(n_{vi}-1)$. In Step 1400, the next batch of triangles is read into computer memory (such as the RAM 64 shown in FIG. 9) from the PMR. Representatives of vertex indices of triangles of the batch are read, until the representative is between 0 and $(n_{vi}-1)$. In Step 1450, the batch of triangles is added to the reference list. In Step 1500, in the batch of triangles, each vertex index is replaced with its representative between 0 and $(n_{vi}-1)$, and subsequently, the batch of triangles is added to the displayable list. It should be noted that after Step 1500 is executed, the list of displayable triangles can be displayed or used for other computations. In Step 1550, the number of Levels 1 of the triangular mesh is incremented.

In Step 1600 the value of $L_{max}$ is set to 1. At this time the number of levels of detail is determined, and is equal to $L_{max}$. The number of vertices belonging to each level are stored, preferably consecutively in an array, such that: the number of vertices of the lowest resolution level, referred to as Level $L_{max}$, is denoted $n_{vLmax}$, and the number of vertices of the highest resolution level, referred to as Level 1, is denoted $n_{vi}$. For example, for the mesh specified in the second exemplary ascii file shown above, $L_{max}=3$, $n_{v1}=16$, $n_{v2}=13$ and $n_{v3}=7$. After this operation is completed, the method ends.

A description is now made of a method for interactively changing the LOD using the PMR. In the PMR a vertex representative array is used for storing representatives of vertices with indices between $n_{vLmax}$ and $(n_{v1}-1)$. The vertex representative array can be gradually built using the above method. Recall that $n_{v1}$ is the number of vertices of the highest resolution mesh, i.e., the sum of the number of vertices of all batches. The representatives can be used either as provided, or can be "ignored", by setting:

representative[i]←i.

If all representatives are ignored, then the highest level of detail triangular mesh can be constructed (Level 1) by using all reference triangle vertex indices.

If all representatives are ignored except between $n_{v2}$ and $(n_{v1}-1)$ (representatives of vertices of Level 2), where the representatives are used as provided, the triangular mesh of Level 2 can be extracted by visiting all triangles of Level 2 and by replacing the vertex indices larger or equal to $n_{v2}$ with their representatives. More generally, if all representatives are ignored except between $n_{vi}$ and $(n_{v1}-1)$, the representatives of vertices of Level i, the triangular mesh of Level i can be extracted by visiting all triangles of Level i and by replacing the vertex indices larger than or equal to $n_{vi}$ with their representatives (and following the representative hierarchy, unless the representatives were path-compressed and are available in that form).

In lieu of ignoring representatives of specific levels, a preferred method for extracting a given level of detail i is to follow the representative hierarchy until an index lower than $n_{vi}$ is determined.

FIG. 3 depicts a method of extracting a particular level of detail from a PMR. In Step 2100 the PMR is inputted to computer memory. In Step 2200 the chosen level of detail L is inputted. In Step 2300 $n_{vL}$ is determined. In Step 2400 a copy is made of the reference triangles of Levels L, L+1, . . . ,$L_{max}$ into "extracted triangles". In Step 2500, for each extracted triangle vertex index, the representative hierarchy is followed until the representative is between 0 and $n_{vL}-1$.

When evolving from Level i of the triangular mesh to Level i-1 (increasing the resolution), the vertex positions and properties (e.g., colors, texture coordinates, color index, surface normals) of vertices of representatives of Level i-1 vertices can be changed by reading them from a secondary array or list, the primary array or list being used to store the original values.

The teachings of this invention enables the transitioning between non-adjacent levels of detail (i.e., enables one or more levels to be skipped), as well transitioning between adjacent levels of detail. Further in this regard, the representation in accordance with this invention is compatible with smooth transitions, or "geomorphs", between levels of detail. When detail is added to the triangular mesh by lowering the LOD from L+1 to L the vertices of Level L are introduced in the mesh. All added vertices have a representative in the lower level of detail mesh. Firstly, the new triangles are determined as explained above, but for the new vertices (vertices of Level L), the coordinates of their representative are used first, which results in a mesh that is geometrically the same as the Level L +1 mesh. Then, gradually, the coordinates are interpolated linearly from that position to the coordinates of the new vertices using a parameter A that varies between 0 and 1, e.g., 0.1, 0.2, etc.

Another aspect of this invention are preferred methods for generating the progressive multi-level representation (PMR) of a triangular mesh. In the preferred embodiments levels are assigned to vertices and triangles of the triangular mesh.

A Multi-Level clustered mesh representation is described in the above-referenced copending U.S. Patent Application Ser. No. 08/976,237, filed Nov. 21, 1997, entitled "Progressive Compression of Clustered Multi-Resolution Polygonal Models", by P. Borrel, W. Horn, and G. Taubin. An exemplary ascii file using the multi-level clustered mesh representation was shown above as the first ascii file.

It should be noted that the teachings of this invention are not limited to only the use of this technique for generating a multi-level clustered representation, and other techniques can be used as well, such as Hoppe's method, Ronfard and Rossignac's method, and, in general, any method for simplifying a triangular mesh by applying a succession of edge collapses.

The vertex levels according to the progressive multi-level representation (PMR) differ with respect to the vertex levels of the multi-level clustered representation. More particularly, the highest level vertices are the same (e.g. the Level 3 vertices in the first ascii file) but the next level (Level 2) comprises both Levels 2 and 3 in the PMR, while Level 1 corresponds to the combination of Levels 1, 2 and 3 in the PMR.

Figure 10:
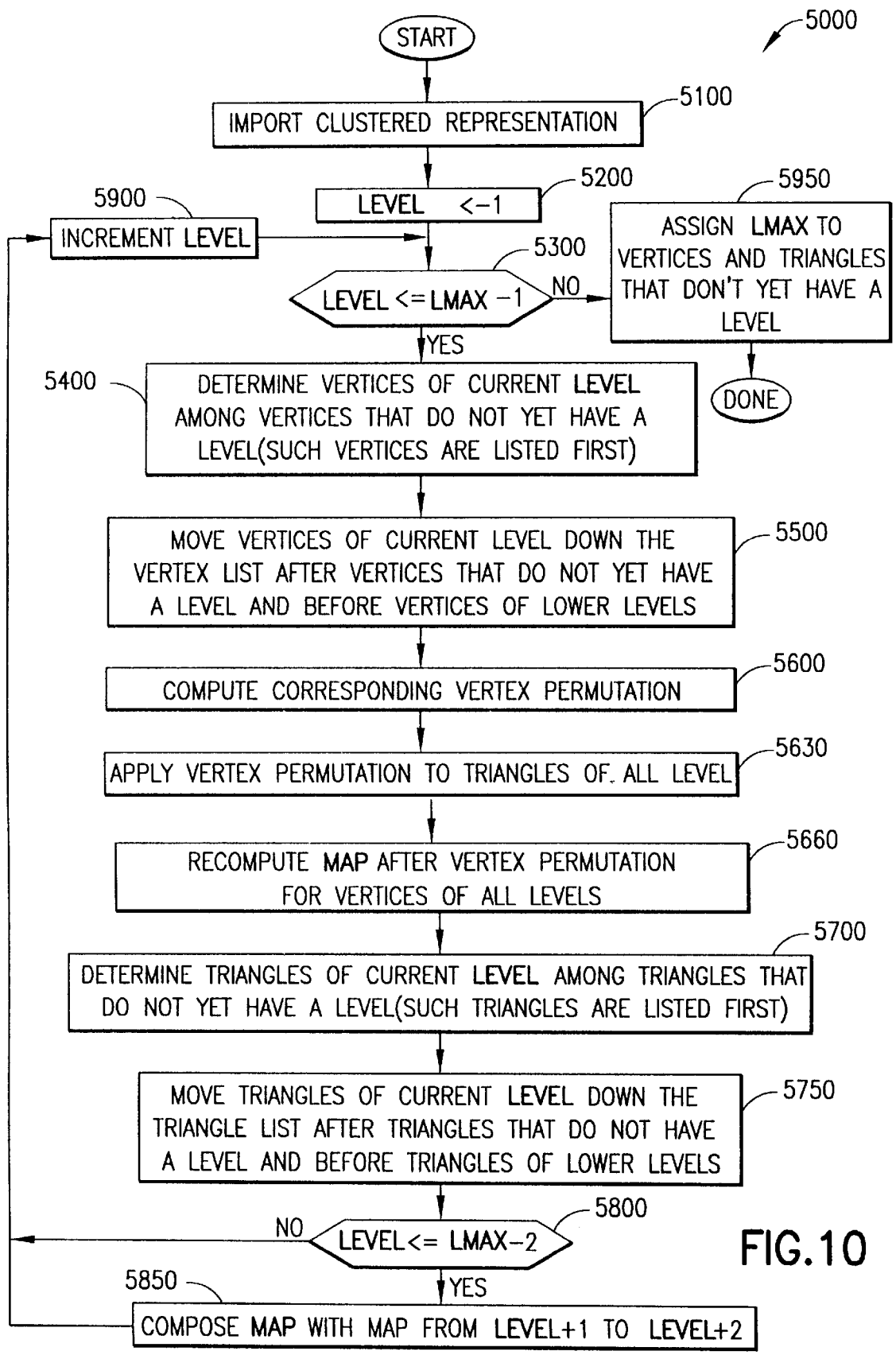
FIG. 10 is a flow chart of a method for converting a multi-level clustered mesh to a PMR.

Referring to FIG. 10 there is illustrated a method 5000 for converting a clustered representation to a PMR. The method includes the following steps. In Step 5100 the clustered representation is imported to computer memory, and lists of vertices and triangles are built from the clustered representation. Vertices and triangles do not have a level. In Step 5200 the current Level is set to 1. In Step 5300 a determination is made if the current level is less than or equal to $L_{max}-1$, with $L_{max}$ being specified as part of the clustered representation as the last level. If this is the case, the method proceeds to Step 5400, otherwise Step 5950 is executed (as described below). In Step 5400 the vertices of the current level are determined among vertices that do not yet have a level, which are vertices listed first in the vertex list, as described below in greater detail with respect to FIG. 11. In Step 5500 the vertices of the current level are moved down the list of vertices to be after vertices that do not yet have a level, and before vertices that have a lower level. In Step 5600 a map (the "maps to vertex" field in the first ascii file shown above) is recomputed after permutation for vertices of all levels (or no level). In Step 5700 the triangles of the current level are determined among triangles that do not yet have a level, which are triangles listed first in the triangle list. Step 5700 is detailed subsequently in reference to FIG. 12. In Step 5750 the triangles of the current level are moved down the triangle list to be after triangles that do not yet have a level, and before triangles of lower levels. In Step 5800 it is determined whether the current level is less than or equal to $L_{max}-2$.

If this is the case, Step 5850 is executed otherwise step 5900 is executed. In Step 5850 the vertex map is composed with a "next vertex map" from the current Level +1 to the current Level +2. The next vertex map is provided in the clustered representation. Next Step 5900 is executed where the current level is incremented. In the above-referenced Step 5950 $L_{max}$ is assigned to all vertices and triangles that do not yet have a level, and the method 5000 is completed.

Figure 11:
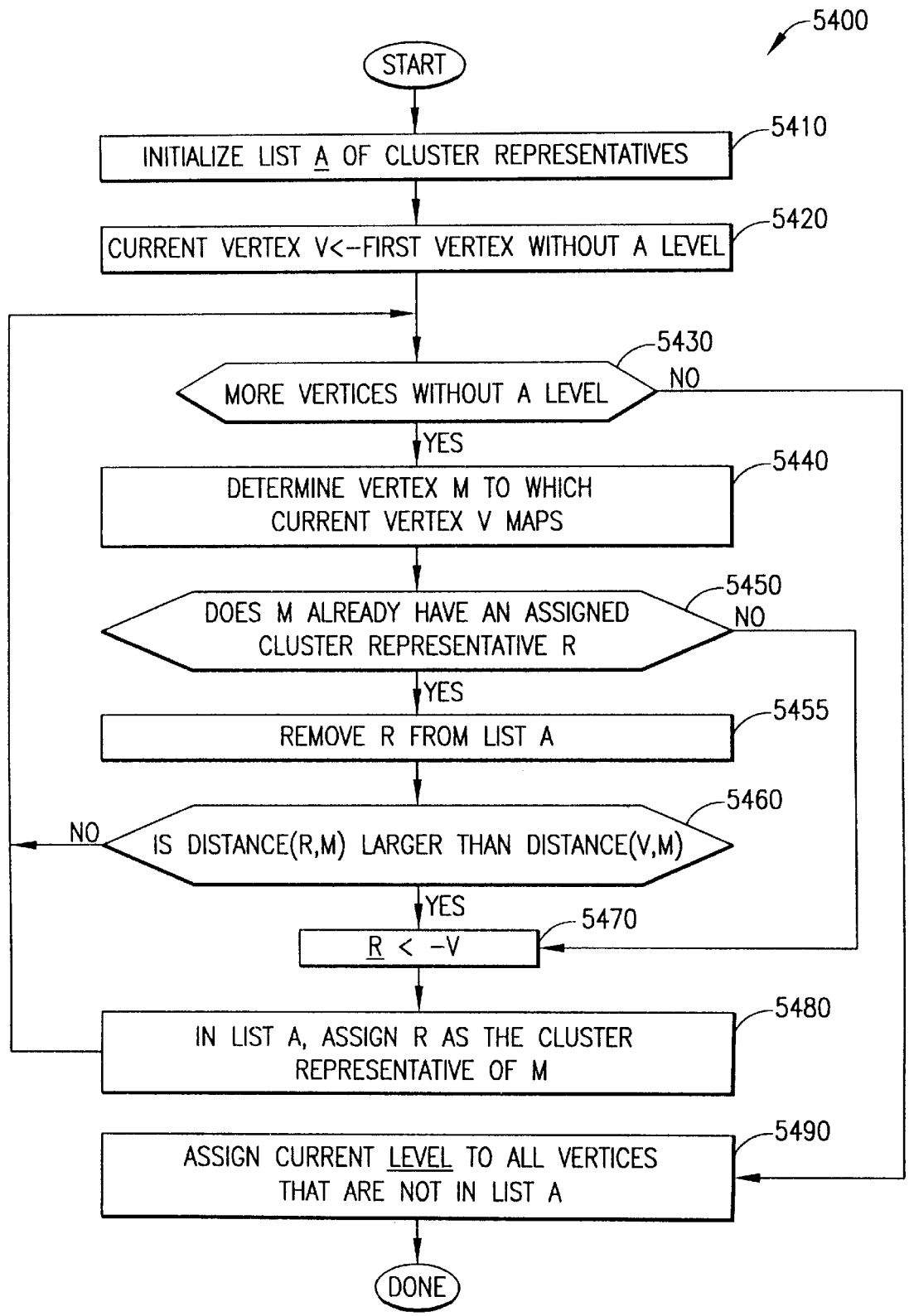
FIG. 11 is a flow chart that illustrates in greater detail the step 5400 of the method of FIG. 10.

Referring to FIG. 11, in the Step 5400 the vertices of the current level are determined among vertices that do not yet have a level. In Step 5410 a list A of cluster representatives is initialized. In Step 5420 a current vertex V is determined to be the first vertex V without a level. In Step 5430 a determination is made if there exists another vertex V without a level. If yes, the method proceeds to Step 5440, otherwise Step 5490 is executed. In Step 5440 a vertex M is determined as the vertex to which V maps (as specified in the "maps to vertex" field shown in the first ascii file above). In Step 5450 a determination is made as to whether M currently has an assigned cluster representative R. If yes, the method proceeds to Step 5455, otherwise Step 5470 is executed. In Step 5455, R is removed from list A. In Step 5460, a determination is made whether a "distance" between R and M is larger than a distance between V and M. Preferably, the distance is a Euclidean distance, although other distances can equally be used. If yes Step 5470 is executed, otherwise a next current vertex V is determined among vertices that do not yet have a level, and Step 5430 is executed. In Step 5470, R is determined to be V, and in Step 5480 R is assigned as the cluster representative of M in list A. A next current vertex V is then determined among the vertices that do not yet have a level, and Step 5430 is executed. In Step 5490 the current level is assigned to all vertices that are not in the list A.

Figure 12:
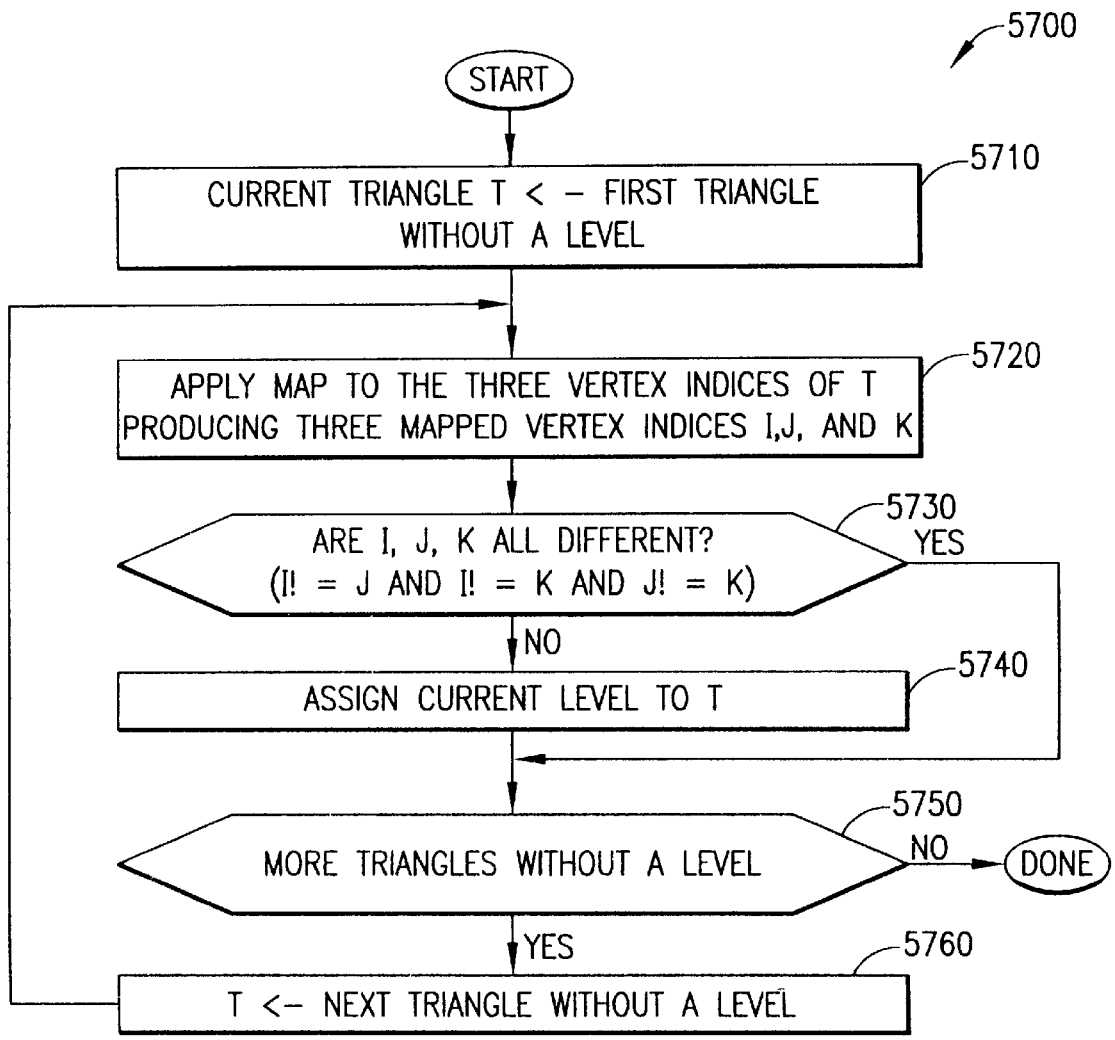
FIG. 12 is a flow chart that illustrates in greater detail the step 5700 of the method of FIG. 10.

Referring to FIG. 12, in the Step 5700 of FIG. 10 the triangles of the current level are determined among triangles that do not yet have a level. More particularly, in Step 5710 a current triangle T is determined to be the first triangle that does not currently have a level. In Step 5720 the map is applied to all three vertex indices of triangle T, producing three "mapped vertex indices" i, j and k. In Step 5730 a determination is made as to whether i, j and k are all different (i.e., whether i is different from j and i is different from k and j is different from k). If this is found to be the case, the method proceeds to Step 5750 otherwise Step 5740 is executed. In Step 5740 the current level is assigned to the triangle T. In Step 5750 a determination is made as to whether there are remaining triangles that do not currently have a level. If yes Step 5760 is executed, otherwise Step 5700 is completed. In Step 5760, T is set to a next triangle that does not currently have a level.

A discussion is now made of a method to assign levels to vertices and triangles and determine vertex representatives. This method is based on successively applying edge collapses to a triangular mesh. An edge collapse is visualized in FIG. 5, and operates as follows: in an edge $(v_1, v_2)$ $v_1$ is "moved" towards $v_2$ until it becomes identified with $v_2$. After the operation, one vertex of the mesh $(v_1)$ is not used, as well as one or two triangles of the mesh. It is useful to refer to such vertices and triangles as "blue vertices" and "blue triangles". Vertices and triangles that remain after the edge collapse are referred to as "red vertices" and "red triangles". Before any edge is collapsed, all vertices and triangles of the mesh are red vertices and red triangles and are assigned the Level 0. The triangular mesh before the application of edge collapses is referred to as the "original mesh"; while the triangular mesh obtained after the application of a succession of edge collapses is referred to as the "current mesh". The mesh shown in FIG. can be represented by the vertex representative array, and the path compressed representative (pc-rep) array, shown in FIG. 4. The method preferably comprises three steps.

Step I: In a first step, illustrated in FIG. 6, a succession of edge collapses is applied to the triangular mesh. A representative is chosen for the vertices that are removed during an edge collapse, and a level is assigned to both endpoints of the edge that is collapsed. To assign the level to both endpoints, the level of vertices incident to either endpoint is queried, as well as the current level of the endpoints. The maximum of such levels is determined, and one is added to the maximum for determining the Level 1 of both endpoints. As is illustrated in FIG. 5, one of the edge endpoints is determined to be the representative of the other.

Two preferred methods determine which triangles become blue triangles as a result of the edge collapse and then assign the Level 1 to such triangles.

Figure 5:
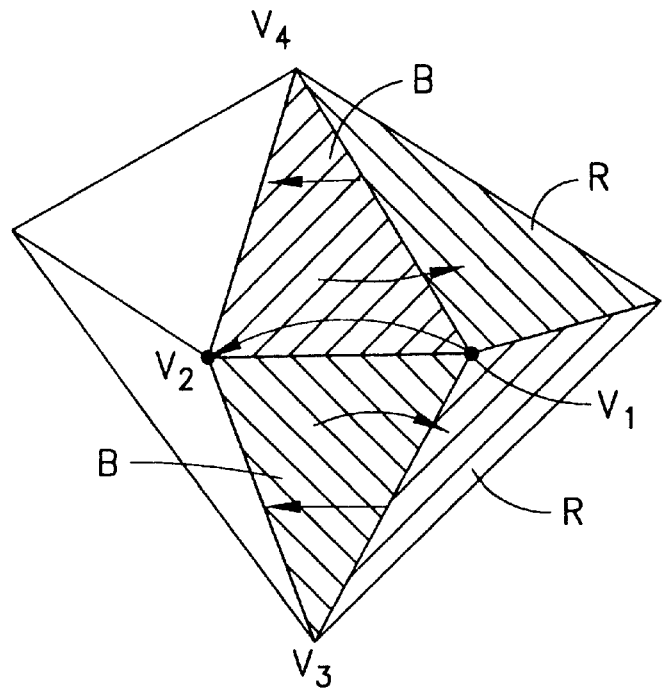
FIG. 5 is a diagram illustrating assignments of representatives when an edge of a triangular mesh is collapsed.

The first preferred method is illustrated in FIG. 5, and includes providing a mapping from the triangles of the current mesh to the triangles of the original mesh. For each edge collapse, one of two triangles to be removed is mapped to the original triangles, and the original triangles are colored blue and are assigned the Level 1.

This mapping is preferably provided by means of triangle representatives as shown in FIG. 4, wherein during each edge collapse, representatives are assigned to up to two triangles that are removed and a triangle of the current mesh is then characterized as being its own representative. A triangle of the current mesh can be indexed with the same ID that was used for that triangle in the original mesh.

The second preferred method operates as follows. Representatives are used for vertices but are not necessary for triangles. Level 1 triangles are identified as follows: when replacing indices of Level 1 vertices in the triangle list with their representatives, triangles that do not currently have a level, and where all three vertex indices are not mutually different (after substitution with the representative), are assigned Level 1. Level 2 triangles are identified as follows: when replacing indices of Level 2 vertices in the triangle list with their representatives, triangles that do not currently have a level, and where all three vertex indices are not mutually different (after substitution with the representative), are assigned Level 2. Subsequent levels are assigned similarly.

Figure 7C:
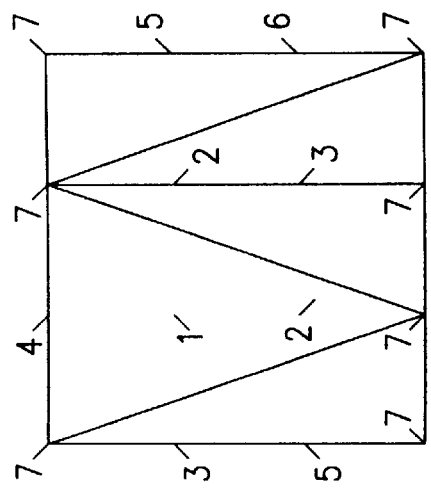
FIGS. 7A–7C illustrate a preferred method to assign levels to vertices and determine vertex representatives.
Figure 7B:
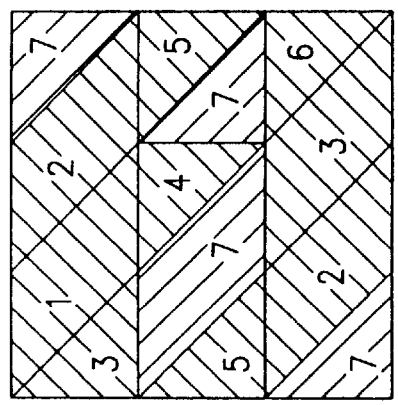
Figure 7A:
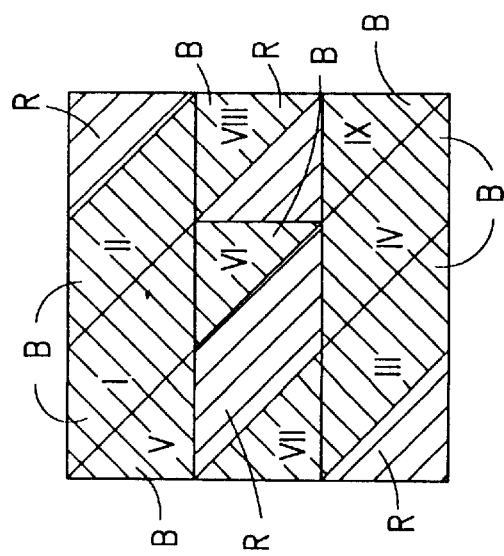

Step II: In a second step, illustrated in FIGS. 7A–7C, and after all possible edge collapses are performed, the largest Level L assigned to a vertex (or triangle) of the mesh is determined. In this case $L_{max}$ is determined as L+1 and is assigned to all remaining vertices and triangles that do not currently have a level. In FIG. 7A the blue (B) triangles are labeled according to the collapse number. In FIG. 7B the surface triangles are partitioned into seven regions (1–7), using the blue vertex levels, wherein triangles with label i are used in surface LODs i, i+1 . . . , 7. In FIG. 7C, after the final edge collapse, all red vertices (designated as 7) are assigned Level 7.

Figure 8:
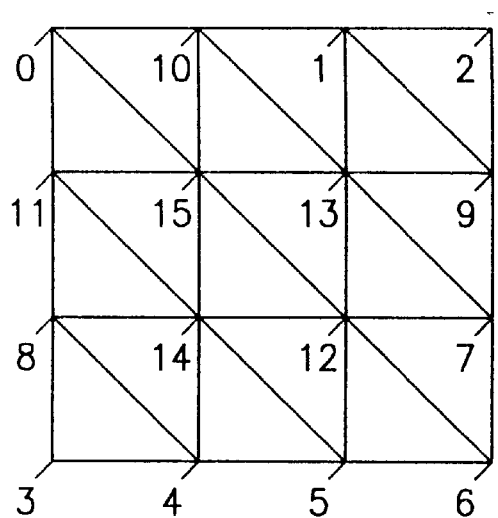
FIG. 8 illustrates the process of re-enumerating vertices in order of decreasing level.

Step III: In a third step, illustrated in FIG. 8, vertices and triangles are re-enumerated according to the level assigned in steps I and II, starting with the higher levels.

A multi-level progressive representation of the original triangular mesh is then completed, which can be written in the exemplary format of the second ascii file shown above, or in another suitable format.

The foregoing method can be used in conjunction with any other method for simplifying a triangular mesh by generating a succession of edge collapse specifications. However, both endpoints of the edge involved in the collapse should be specified by using their ID in the original mesh.

During the use of this invention the edge collapse specifications can be partially ordered, providing an ability to perform them in an order different from the order originally specified. The partial ordering is preferably encoded using a Directed Acyclic Graph such as the one illustrated in FIG. 6.

Further in this regard, the DAG is constructed for storing the partial ordering of the edge collapses. Referring again to FIG. 6, if performing a certain collapse, such as the collapse V with the blue vertex 4 and the red vertex 0 (4→0), requires that other collapses be performed beforehand, e.g., collapse I (5→1) and collapse III (9→13), it is preferred to add two edges (V→I) and (V→III) to the DAG. This implies that the situations in which V has status C (collapsed) and I has status S (split) or III has status S are impossible. The DAG is preferably stored as two separate hash tables, one that for V stores both I and III, and a second hash table for I and III stores V. There are several possibilities here: essentially, for each vertex of the DAG, it is desired to have a list of all the directed edges that enter the vertex and all the directed edges that exit the vertex. Note that V has two collapse constraints and that I and III each have one split constraint. When V is split, then one can decrement the number of split constraints of I and III. Similarly, one can increment or decrement collapse constraints. The complete DAG for the Simple surface is represented in FIG. 6, and the DAG completely defines valid collapses and splits.

Vertex representatives are analogous to conventional triangle proxies where an octree is used to represent vertex hierarchies. This approach is, however, different from the present method. The approach of this invention also differs from conventional techniques where a DAG is used to represent local surface updates, in that the technique of this invention is simpler, as each vertex represents exactly one edge collapse, and the directed edges represent dependencies between collapses.

Once the final ordered list of edge collapses is known, the technique of this invention operates to redo the collapses in their original order, ignoring the geometry, which was examined during simplification. The vertex levels can be computed at this stage. For example, when redoing the collapse I of FIG. 6, note that Vertex 5 influences Vertex 1. In a vertex influence hash table the method records for Vertex 1 that 5 influences 1. The method also examines the current level of all vertices in the star of the collapsed edge. Each level greater than zero indicates that the corresponding vertex was the outcome of a collapse. Those edge collapses are retrieved that influenced that particular vertex using the influence hash table. For example, and noting that collapses I and III must have occurred before, the method consigns the information V≧I, III in the DAG.

With regard to dynamic local LOD specification, one can refer to an edge collapse using the corresponding blue vertex, which has either the C status or the S status (if it became red). Initially, the surface is fully simplified and all blue vertices except the ones with split constraints are entered in a split priority queue. The split priority queue is keyed with an error before split, with larger values coming first. The error depends upon the location of the vertex, simplification error measurements and the projection parameters. A collapse priority queue is initially empty. The collapse queue is keyed with the error after collapse, with lower values coming first.

The following step applies for a series of views: while the error of the top vertex in the split priority queue is larger than a maximum error, the method splits the blue vertex, and updates the corresponding maximum collapse constraints and the collapse queue (such vertices can now be collapsed). Then, while the error of the top vertex in the collapse priority queue is smaller than the maximum error, the method collapses blue vertices on that queue. Corresponding triangles are added or removed to a display list, represented for instance using a doubly linked list of triangles.

By way of example, a Virtual Reality Modeling Language (VRML) implementation of the invention is now discussed, specifically a VRML2.0 implementation which is based on defining a new node using a PROTO mechanism, and the use of Java™ in the script node for the logic. An exemplary VRML file describing a progressive IndexedFaceSet is as follows:

```
#VRML V2.0 utf8
PROTO ProgIfs
[
    field     SFString   urlData
    eventIn   SFFloat    setLevel
]
{
    DEF ifs IndexedFaceSet {
        coord Coordinate { }
    }
    DEF script Script {
        url      "ProgIfs.class"
        field    SFString   urlData   IS urlData
```

-continued

```
        field    SFNode     ifs       USE ifs
        eventIn  SFFloat    setLevel  IS  setLevel
    }
}
Shape {
    geometry ProgIfs {
        urlData "sample.data"
    }
}
```

The new Node behaves as an IndexedFaceSet, has a Universal Resource Locator (URL) of the file containing the data as the only field (instance variable) to be set up when the node is instantiated, and one eventIn used by a browser program to request a new level of detail.

The Java™ program in the script node performs two functions. Upon instantiation, a thread is started to download the data from the URL provided in the urlData field, immediately returning control to the browser. After the browser regains control, it can request a change in level of detail by sending a setLevel event to the node. The changes in the level of detail of the IndexedFaceSet node are handled by the main thread of the script code.

The download thread progressively downloads the total number of levels of detail, vertex, triangle, and attribute data, and periodically updates the corresponding arrays (triangle array, vertex pc-rep array, vertex representative array, and optionally attribute arrays). These arrays, which are private to the script code but persist after the download thread finishes, are used later by the main thread of the script code to update the IndexedFaceSet fields responding to browser requests. The main thread does so by setting and changing values of the coord and coordIndex fields (and optionally of the other attribute fields), as a function of the data downloaded so far by the download thread, and the requested level of detail.

In a preferred implementation the setLevel value is first clipped to the currently valid range as a function of the data downloaded so far by the download thread. If after the clipping setLevel does not have an integer value, the vertex coordinates are interpolated between the two consecutive integer values immediately preceding and succeeding the given value. This step increases the complexity of the script code, but provides support for smooth transitions between consecutive levels of detail. Alternatively, the set Level event can be defined as SFInt32. Note that the foregoing exemplary VRML file does not show the VRML logic necessary to trigger the change in level of detail events. However, this can be accomplished in several different ways, depending on the application. As a simple case, a TimeSensor can be set up to periodically send setLevel events to the node with cycling values.

In another method for interactively changing the LOD the Java™ program displays a user interface, whereby the user is enabled via a text entry or scroll bar manipulation to specify a LOD. In response, the Java™ program computes directly the specified LOD, without requiring a specific VRML setLevel event.

Figure 9:
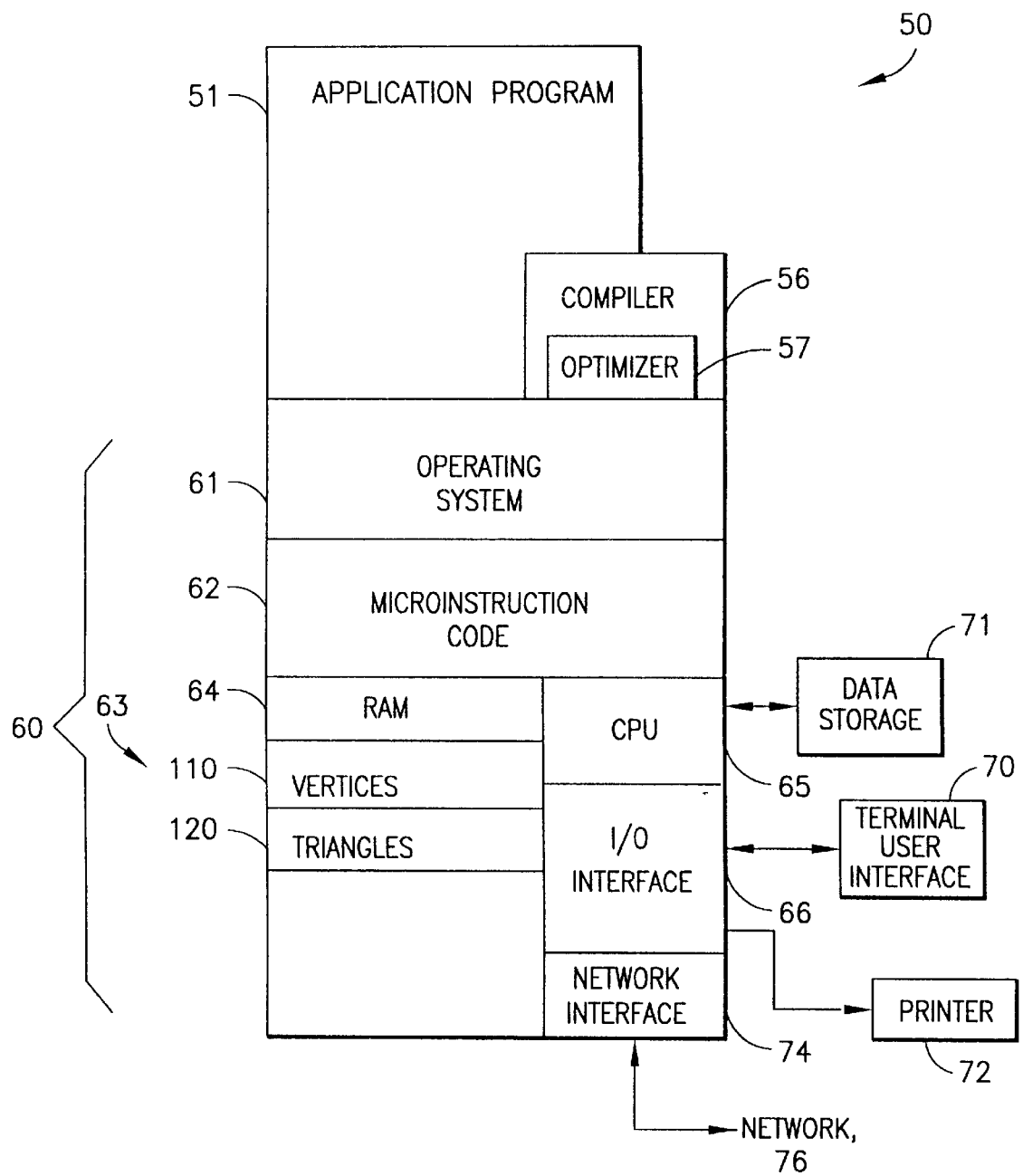
FIG. 9 is a block diagram of a data processing system that is suitable for practicing this invention.

To show the progress of the download thread, the script code can be modified to automatically update the IndexedFaceSet fields with the highest resolution level of detail available as soon as all the data associated with it finishes downloading. Alternatively, the node could behave as a LOD node instead, with the script adding new levels to the LOD node as soon as they are available. However, the smooth transition between levels would be more difficult to implement. FIG. 9 is a block diagram showing an exemplary computer system 50 on which preferred embodiments of the methods of this invention operate. The preferred embodiment includes one or more application programs 51. The application programs 51 operate on a computer platform 60 which includes a hardware unit 63. Some application programs 51 that run on the computer system 50 include, according to the present invention, programs that implement the methods illustrated in FIGS. 2, 3, 10, 11 and 12.

The hardware unit 63 includes one or more central processing units (CPU) 65, a random access memory (RAM) 64, and an input/output interface 66. Microinstruction code 62, for instance a reduced instruction set, may also be included on the platform 60. Various peripheral components may be connected to the computer platform 60, including a graphical interface or terminal and user interface 70, a data storage device 71, and a printing device 72. A network interface 74 (such as a modem) provides a connection to a network 76 for enabling the progressive transmission and display of polygonal surfaces in accordance with an aspect of this invention. An operating system 61 coordinates the operation of the various components of the computer system 50. An example of computer system 50 is the IBM RISC System/6000 (RISC System/6000 is a trademark of the International Business Machines Corporation.) It is readily understood that those skilled in the computer arts will be familiar with many equivalent computer systems 50, and the teachings of this invention are not intended to be limited for use with any one particular type of computer or computer architecture.

The RAM memory 64 stores representations of the data structure 100 shown in FIG. 1, including the vertices data structure 110 and the triangles data structure 120, as well as the other data, tables, queues and the like required to implement the above-described methods. It should be realized that these data structures and other data could as well be maintained in the data storage unit 71, or on both the RAM 64 and data storage unit 71.

Described above has been a technique for partitioning a surface in Levels of Detail (LODs), using the output of any suitable algorithm that performs edge collapses on a surface. For global LODs, the representation is comprised of a batch of surface portions, each surface portion being represented with point positions and an indexed face set. Each surface portion corresponds to an increment from one level of detail to the next. In addition, an array of vertex representatives is provided and vertex indices are replaced with their representatives before display. Also described is an exemplary implementation of this representation in VRML. The inventors have thus provided a simple and efficient framework for the progressive transmission and display of polygonal surfaces.

The disclosures of the above-referenced commonly assigned U.S. Patent Applications are incorporated by reference herein in their entireties.

While the invention has been particularly shown and described with respect to preferred embodiments thereof, it will be understood by those skilled in the art that changes in form and details may be made therein without departing from the scope and spirit of the invention.

What is claimed is:

1. A method for generating a multi-level progressive representation of a triangular mesh, comprising steps of:

specifying a collection of vertex and triangle lists, with one pair (vertex list, triangle list) being provided for each Level of Detail in order of decreasing Level of Detail, wherein a pair (vertex list, triangle list) of a Level of Detail i is referred to as a batch of Level of Detail i;

for each Level of Detail i of the triangular mesh, determining a total number of vertices ($n_{vi}$) of the Level of Detail i as the sum of vertices in batches i, i+1 ..., $L_{max}$, where x represents a lowest Level of Detail; and for each triangle vertex index that is not between 0 and ($n_{vi}$–1), specifying a vertex representative index, wherein if the vertex representative index is not between 0 and ($n_{vi}$–1), specifying a vertex representative index for the triangle vertex index, with a succession of vertex representative indices being specified such that a last vertex representative index is between 0 and ($n_{vi}$–1).

2. A method as in claim 1, wherein to fully specify the Level of detail i of the triangular mesh, all batches of Levels i, i+1 ..., $L_{max}$ are required.

3. A method as in claim 1, wherein the step of specifying includes a step of assigning Levels of Detail to vertices and triangles.

4. A computer data structure for representing a multi-level progressive representation of a triangular mesh, comprising:

triangular mesh vertex coordinates and triangle vertex indices, stored in batches from a level of detail ($L_{max}$) associated with a lowest resolution, to a level of detail (1), associated with a highest resolution; and vertex representative indices for triangle vertex indices having a value outside of a range allowed in a current level of detail.

5. A computer data structure as in claim 4, wherein each batch also stores vertex and triangle properties.

6. A computer data structure as in claim 4, wherein the vertex representative indices are provided as required by triangle vertex indices.

7. A computer data structure as in claim 4, wherein a secondary vertex position is provided for each vertex of level between $L_{max}$ and 1 such that, for a vertex that is a representative of another vertex at a level of detail i, the secondary vertex position is used for the vertex when decreasing the resolution by transitioning from level i +1 to level i.

8. A computer data structure as in claim 4, wherein a secondary vertex property is provided for each vertex of level between $L_{max}$ and 1 such that, for a vertex that is a representative of another vertex at a level of detail i, the secondary vertex property is used for the vertex when decreasing the resolution by transitioning from level i+1 to level i.

9. A computer data structure as in claim 4, wherein the vertex representative indices are provided together, in conjunction with a first batch of triangles.

10. A computer data structure as in claim 4, wherein the vertex representatives are stored in direct form in a path compressed representative array.

11. A computer data structure as in claim 4, wherein the triangle vertex indices are maintained in a reference list and a current list, wherein a reference copy stored in the reference list can be read only, and wherein a current copy stored in the current list can be read, modified, and used for display and other computations.

12. A method for extracting a particular level of detail i from a multi-level progressive representation of a triangular mesh, comprising steps of:

determining vertices and triangles participating in the level of detail i, the step of determining including a step of determining a highest index $n_{vi}$ of a vertex participating in the level of detail; and for each triangle participating in the level of detail, and for each vertex index of the triangle, replacing each vertex index with a representative vertex index that is in a valid range of indices between 0 and ($n_{vi}-1$).

13. A method as in claim 12, wherein the vertices and triangles that participate in the level of detail i are determined to be the vertices and triangles of a first batch of vertices and triangles, and then of a second batch of vertices and triangles, and so on until the number of vertices equals $n_{vi}$.

14. A method as in claim 12, wherein for each triangle that participates in the level of detail, for each vertex index of the triangle, replacing each vertex index with a representative between 0 and ($n_{vi}-1$) by following a representative hierarchy until the representative index has a value between 0 and ($n_{vi}-1$).

15. A method as in claim 12, wherein for a given level of detail i, vertex representatives are ignored between $n_{vi}$ and ($n_{v1}-1$), and are used between $n_{vLmax}$ and ($n_{v1}-1$); and the vertex indices of triangles that participate in the level of detail i are replaced using the representative vertex indices.

16. A method as in claim 12, and including a step of providing a smooth transition between two adjacent levels of detail when detail is added to the triangular mesh by transitioning from a Level L +1 to a Level L, comprising steps of:
   adding the vertices of Level L to the triangular mesh, wherein the added vertices have a representative in a lower level of detail triangular mesh;
   determining new triangles having new vertices (vertices of Level L), where the coordinates of the vertex representatives are used first for producing a triangular mesh that is geometrically the same as the Level L +1 triangular mesh; and
   linearly interpolating the coordinates of the vertices from the produced triangular mesh to the coordinates of the new vertices using a parameter A that varies between 0 and 1.

17. A method for use in a computer system for generating a multi-level progressive representation of a triangular mesh, comprising steps of:
   assigning levels of detail (LODs) to vertices and triangles; and
   determining vertex representatives, such that a representative of a vertex is a vertex of a higher LOD of decreased resolution.

18. A method as in claim 17, wherein the triangular mesh is provided as a multi-level clustered representation, and further comprising steps of:
   converting vertex levels of the multi-level clustered representation to vertex levels of a multi-level progressive representation;
   assigning levels to triangles; and
   ordering vertices and triangles in order of decreasing level.

19. A method as in claim 17, wherein a sequence of edge collapse specifications is specified as an ordered list of ordered pairs of vertex IDs of the triangular mesh, and further comprising steps of:
   assigning levels to vertices and triangles, and determining vertex representatives;
   determining $L_{max}$ as a level of least resolution, and assigning $L_{max}$ to all remaining vertices and triangles not having a representative; and
   ordering vertices and triangles in order of decreasing level.

20. A method for defining a partial ordering of edge collapse specifications given a sequence of edge collapse specifications, comprising steps of:
   obtaining a final ordered list of edge collapses;
   redoing the collapses in their original order and computing vertex levels; and
   examining the current level of all vertices in a star of a collapsed edge, wherein each level greater than zero indicates that the corresponding vertex was the outcome of a collapse.

21. A method as in claim 20, wherein the defined partial ordering is stored using a Directed Acyclic Graph.

22. A method for lowering a Level of Detail (LOD) of a triangular mesh from a Level L +1 to a Level L, comprising steps of:
   providing a progressive multi-level representation of the triangular mesh; and
   providing a smooth transition between two adjacent LODs when detail is added to the triangular mesh by transitioning from Level L +1 to Level L, the step of providing comprising steps of,
   adding vertices of triangles of Level L to the triangular mesh, wherein the added vertices have a representative in a lower LOD triangular mesh;
   determining new triangles having new vertices (vertices of Level L), where the coordinates of the vertex representatives are used first for producing a triangular mesh that is geometrically the same as the Level L +1 triangular mesh; and
   linearly interpolating the coordinates of the vertices from the produced triangular mesh to the coordinates of the new vertices using a parameter A that varies between 0 and 1.

23. A system for generating a representation of a triangular mesh, comprising:
   a memory storing a data structure for representing a multi-level progressive representation of the triangular mesh, the data structure comprising (a) triangular mesh vertex coordinates and triangle vertex indices stored in batches from a level of detail ($L_{max}$) associated with a lowest resolution to a level of detail (1) associated with a highest resolution, and (b) vertex representative indices for triangle vertex indices having a value outside of a range allowed in a current level of detail;
   at least one data processing unit; and
   a program executed by the at least one data processing unit for extracting a particular level of detail i from the multi-level progressive representation, the program operating to determine those vertices and triangles participating in the level of detail i, including determining a highest index $n_{vi}$ of a vertex participating in the level of detail, and for each triangle participating in the level of detail, and for each vertex index of the triangle, the program operating to replace each vertex index with a representative vertex index that is in a valid range of indices between 0 and ($n_{vi}-1$).

24. A system as in claim 23, and further comprising a network interface coupled to a data communications network, wherein at least a representation of the triangular mesh is received from the network.

25. A system as in claim 23, and further comprising:
   a network interface coupled to a data communications network; and
   a download thread for progressively downloading from the network a total number of levels of detail, and triangle, vertex, and attribute data of the triangular mesh.

* * * * *

UNITED STATES PATENT AND TRADEMARK OFFICE
CERTIFICATE OF CORRECTION

PATENT NO. : 6,031,548
DATED : 2/29/2000
INVENTOR(S) : Gueziec et al.

It is certified that error appears in the above-identified patent and that said Letters Patent is hereby corrected as shown below:

In the claims, col. 18, line 4, "X" is in error.
The correct symbol is "$L_{max}$".

Col. 19, Line 34, "A" is in error.
The correct symbol is "$\lambda$".

Col. 20, line 30, "A" is in error.
The correct symbol is "$\lambda$".

Signed and Sealed this

Twentieth Day of February, 2001

Attest:

NICHOLAS P. GODICI

Attesting Officer     Acting Director of the United States Patent and Trademark Office